US012614447B2

(12) United States Patent
S et al.

(10) Patent No.: US 12,614,447 B2
(45) Date of Patent: Apr. 28, 2026

(54) SECURITY SYSTEM WITH IMPROVED COMMUNICATIONS RELIABILITY

(71) Applicant: Honeywell International Inc., Charlotte, NC (US)

(72) Inventors: Ruban S, Tamilnadu (IN); Balamurugan Ganesan, Bengaluru (IN); Vaibhav Shivaji Sable, Shevgaon (IN); Venkatesh Paramasivam, Bangalore (IN)

(73) Assignee: HONEYWELL INTERNATIONAL INC., Chartlotte, NC (US)

( * ) Notice: Subject to any disclaimer, the term of this patent is extended or adjusted under 35 U.S.C. 154(b) by 94 days.

(21) Appl. No.: 18/635,833

(22) Filed: Apr. 15, 2024

(65) Prior Publication Data

US 2025/0322743 A1 Oct. 16, 2025

(51) Int. Cl.
*G08B 29/02* (2006.01)
*G08B 26/00* (2006.01)

(52) U.S. Cl.
CPC ............ *G08B 29/02* (2013.01); *G08B 26/00* (2013.01)

(58) Field of Classification Search
CPC ................................ G08B 29/02; G08B 26/00
See application file for complete search history.

(56) References Cited

U.S. PATENT DOCUMENTS 10,708,121 B2 * 7/2020 Lee ..................... H04L 41/0663
11,349,704 B2 * 5/2022 Fang ................... H04L 41/0654
11,870,640 B2 * 1/2024 Peterson ............. H04W 40/205
2014/0173330 A1 6/2014 Samanta et al.
2022/0386152 A1 * 12/2022 McRae ................ G08B 25/004
(Continued)

FOREIGN PATENT DOCUMENTS

CN 107071760 A 8/2017
CN 107831426 A 3/2018
CN 117750380 A 3/2024
(Continued)

OTHER PUBLICATIONS

Ross, "Resideo Discovers Issue With Small Number of Verizon SIMS", Alarm Grid, 7 pages, Apr. 8, 2022, Accessed Dec. 19, 2023.
(Continued)

*Primary Examiner* — Steven Lim
*Assistant Examiner* — James E Munion
(74) *Attorney, Agent, or Firm* — Seager, Tufte & Wickhem, LLP

(57) ABSTRACT

A security system includes an on-site security panel and an off-site central monitoring station (CMS). The on-site security panel communicating security related alarms to the CMS via a primary communication path when the primary communication path has not failed, and communicating security related alarms to the CMS via a secondary communication path when the primary communication path has failed. The on-site security panel periodically sends a secondary path supervision message to the CMS via the secondary communication path at a secondary communication path supervisory rate. The on-site security panel performs self-tests on the circuitry supporting the secondary communication path between the periodic secondary path supervision messages.

18 Claims, 11 Drawing Sheets

(56) References Cited

U.S. PATENT DOCUMENTS

2023/0379182 A1 11/2023 Ganesan et al.

FOREIGN PATENT DOCUMENTS

EP 1696400 A1 8/2006
EP 4096345 A1 11/2022

OTHER PUBLICATIONS

Jablotron Alarms A.S., "JA-14K (R) Security System Control Panel," https://www.jablotron.com/en/support/downloads, Sep. 2, 2019, pp. 1-72, XP093303623.
Extended European Search Report, EP Application No. 25167698.7, European Patent Office, Aug. 19, 2025 (13 pages).

* cited by examiner

120

| Cell Radio | |
|---|---|
| Network | Home Service |
| Cell provider | "IND airtel" |
| Signal strength |  |
| Data connection status | Active |
| Network error message | None |
| SIM Card status | Normal State |
| Module Type | Gemalto ELS61-E R2 |
| Module Version | 02.000-01.000.02 |
| Network Type | 4G |
| RSRP | -81 dBm |
| RSRQ | -8 dB |

SECURITY SYSTEM WITH IMPROVED COMMUNICATIONS RELIABILITY

TECHNICAL FIELD

The present disclosure relates generally to security systems and more particularly to improving communications reliability within a security system.

BACKGROUND

Security systems frequently include local or edge devices such as security panels as well as remote or cloud devices such as central monitoring stations. During operation, alarms and/or other data collected at the security panel are transmitted to the central monitoring station, wherein an operator at the central monitoring station may take action as necessary. Because communication of alarms and/or other data from the security panel to the central monitoring station is deemed important for the proper monitoring of a space, many security systems include a primary communication channel between the local and remote devices as well as a secondary or backup communication channel. The secondary or backup communication channel is used during those times when the primary communication channel is down. In some cases, the primary communication channel is a wired communication channel and the secondary communication channel is a wireless communication channel, such as a cellular communication channel. In some cases, the secondary communication channel may have a reduced bandwidth and/or a higher operating cost than the primary communication channel.

To ensure the reliability of the security system, the functionality of the primary communication channel and the secondary communication channel may be periodically tested. The functionality of the primary communication channel is often tested more frequently than the second communication channel. For example, the primary communication channel may be tested at intervals measured in seconds or minutes while the secondary communication channel may be tested at intervals measured in hours or days. When so provided, the secondary communication channel may fail and remain inoperable for some time before it is discovered to be inoperable by the next test of the secondary communication channel. If the primary communication channel were to go down during this period, both the primary communication channel and the second communication channel would be down, preventing critical alarms and/or other data from being communicated from the security panel to the central monitoring station. What would be desirable are ways of determining more quickly that the secondary communication channel may have failed, so that steps may be taken to resolve the failure of the secondary communication channel before such time as the secondary communication channel is actually needed as a result of a failure of the primary communication channel.

SUMMARY

The present disclosure relates generally to security systems and more particularly to improving communications reliability within a security system. An example may be found in a method for improving the reliability of a security system that includes an on-site security panel and an off-site central monitoring station (CMS), the on-site security panel communicating security related alarms to the CMS via a primary communication path when the primary communication path has not failed, and communicating security related alarms to the CMS via a secondary communication path when the primary communication path has failed. The illustrative method includes the on-site security panel periodically sending a primary path supervision message to the CMS via the primary communication path at a primary communication supervisory rate, and receiving a corresponding acknowledgement via the primary communication path for each of the primary path supervision messages when the primary communication path has not failed. The illustrative method includes the on-site security panel periodically sending a secondary path supervision message to the CMS via the secondary communication path at a secondary communication path supervisory rate, and receiving a corresponding acknowledgement for each of the secondary path supervision messages when the secondary communication path has not failed, wherein the primary communication supervisory rate is higher than the secondary communication supervisory rate.

The on-site security panel includes circuitry supporting communication with the CMS via the secondary communication path. The on-site security panel periodically performing a self-test of at least part of the circuitry supporting communication with the CMS via the secondary communication path at a self-test rate. The self-test is configured to identify one or more failures associated with the circuitry supporting communication with the CMS via the secondary communication path, but does not send a supervision message to the CMS via the secondary communication path. In response to the self-test identifying one or more failures associated with the circuitry supporting communication with the CMS via the secondary communication path, the illustrative method includes the on-site security panel sending a self-test triggered secondary path supervision message to the CMS via the secondary communication path, and receiving a corresponding acknowledgement when the secondary communication path has not failed. When the corresponding acknowledgement is not received in response to sending the self-test triggered secondary path supervision message to the CMS, the method includes sending a secondary path failure alert to the CMS via the primary communication path. In response to the self-test not identifying one or more failures associated with the circuitry supporting communication with the CMS via the secondary communication path, the method includes the on-site security panel not sending the self-test triggered secondary path supervision message to the CMS via the secondary communication path.

Another example may be found in an on-site control panel that includes a primary communication circuit configured to support communication with an off-site central monitoring station (CMS) over a primary communication path and a secondary communication circuit configured to support communication with the CMS over a secondary communication path. A controller is operatively coupled the primary communication circuitry and the secondary communication circuitry. The controller is configured to communicate alarms to the CMS via the primary communication path when the primary communication path has not failed, and communicate alarms to the CMS via the secondary communication path when the primary communication path has failed. The controller is configured to repeatedly send a primary path supervision message to the CMS via the primary communication path at a primary communication supervisory rate, and receive a corresponding acknowledgement via the primary communication path for each of the primary path supervision messages when the primary communication path has not failed. The controller is configured to repeatedly send a secondary path supervision message to the CMS via the secondary communication path at a secondary communication path supervisory rate, and receive a corresponding acknowledgement for each of the secondary path supervision messages when the secondary communication path has not failed, wherein the primary communication supervisory rate is higher than the secondary communication supervisory rate. The controller is configured to repeatedly performing a self-test of the circuitry supporting communication with the CMS via the secondary communication path at a self-test rate, wherein the self-test is configured to identify one or more failures associated with the circuitry supporting communication with the CMS via the secondary communication path, but does not send a supervision message to the CMS via the secondary communication path. In response to the self-test identifying one or more failures associated with the circuitry supporting communication with the CMS via the secondary communication path, the controller is configured to send a self-test triggered secondary path supervision message to the CMS via the secondary communication path, and receive a corresponding acknowledgement when the secondary communication path has not failed. When the corresponding acknowledgement is not received in response to sending the self-test triggered secondary path supervision message to the CMS, the controller is configured to send a secondary path failure alert to the CMS via the primary communication path. In response to the self-test not identifying one or more failures associated with the circuitry supporting communication with the CMS via the secondary communication path, the controller is configured to not send the self-test triggered secondary path supervision message to the CMS via the secondary communication path.

Another example may be found in a method for operating an on-site control panel, wherein the on-site control panel is configured to communicate alarms to an off-site central monitoring station (CMS) via a primary communication path when the primary communication path has not failed, and to communicate alarms to the CMS via a secondary communication path when the primary communication path has failed. The illustrative method includes the on-site control panel periodically sending a primary path supervision message to the CMS via the primary communication path at a primary communication supervisory rate, and receiving a corresponding acknowledgement via the primary communication path for each of the primary path supervision messages when the primary communication path has not failed. The method includes the on-site control panel periodically sending a secondary path supervision message to the CMS via the secondary communication path at a secondary communication path supervisory rate, and receiving a corresponding acknowledgement for each of the secondary path supervision messages when the secondary communication path has not failed, wherein the primary communication supervisory rate is higher than the secondary communication supervisory rate. The on-site control panel monitors for one or more abnormalities associated with circuitry supporting communication with the CMS via the secondary communication path between times that the on-site control panel periodically sends the secondary path supervision message to the CMS. When the on-site control panel detects one or more abnormalities associated with circuitry supporting communication with the CMS via the secondary communication path, the method includes the on-site control panel sending a secondary path failure alert to the CMS via the primary communication path.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which.

Figure 1:
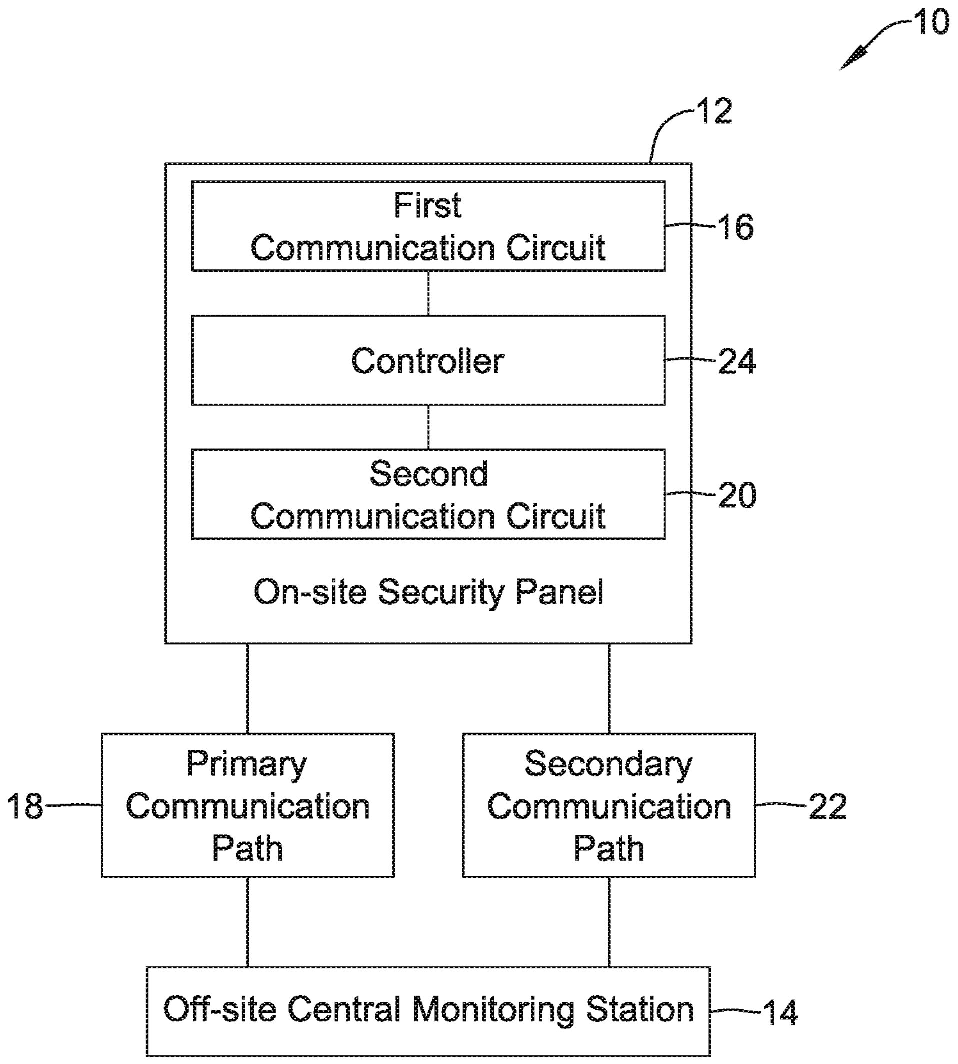
FIG. 1 is a schematic block diagram showing an illustrative security system.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative security system 10. The illustrative security system 10 includes an on-site control panel 12 and an off-site central monitoring station (CMS) 14. The on-site control panel 12 may be located within a building that the security system 10 is protecting, and the off-site CMS 14 may be located in a different building, and may be part of the same campus as the building that the security system 10 is protecting. In some cases, the off-site CMS 14 may be cloud-based, and may physically be located hundreds or even thousands of miles away from the building that the security system 10 is protecting. The on-site control panel 12 may receive sensor signals from a variety of security sensors (not shown) placed throughout the building, and may determine that one or more of the sensor signals indicate a potential problem. In response, the on-site control panel 12 may send an alert to the off-site CMS 14.

The on-site control panel 12 may include a first communication circuit 16 that is configured to support communication with the off-site CMS 14 over a primary communication path 18 and a second communication circuit 20 that is configured to support communication with the off-site CMS 14 over a secondary communication path 22. In some cases, the primary communication path 18 may include a wired communication path such as an Ethernet path. In some cases, the secondary communication path 22 may be a wireless communication path such as a cellular communication path. The cellular communication path may be a 3G, 4G or 5G cellular communication path. The illustrative on-site control panel 12 includes a controller 24 that is operatively coupled to the first communication circuit 16 and to the second communication circuit 20. The controller 24 is configured to control how the on-site control panel 12 communicates with the off-site CMS 14. In some cases, the controller 24 may also control other functions and operations of the on-site control panel 12.

Figure 2A:
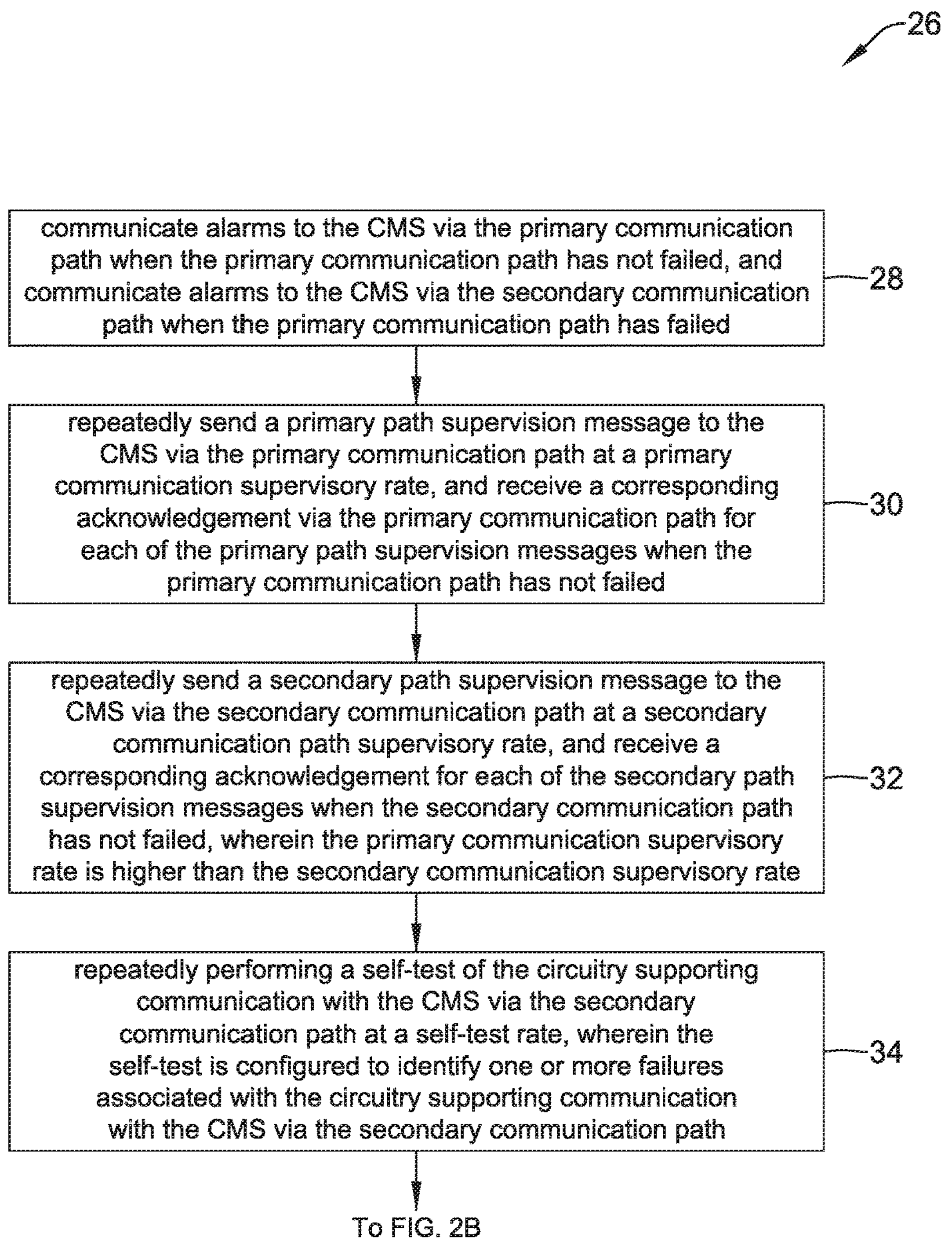
FIGS. 2A and 2B are flow diagrams that together show an illustrative series of steps taken by the controller forming part of the illustrative security system of FIG. 1.
Figure 2B:
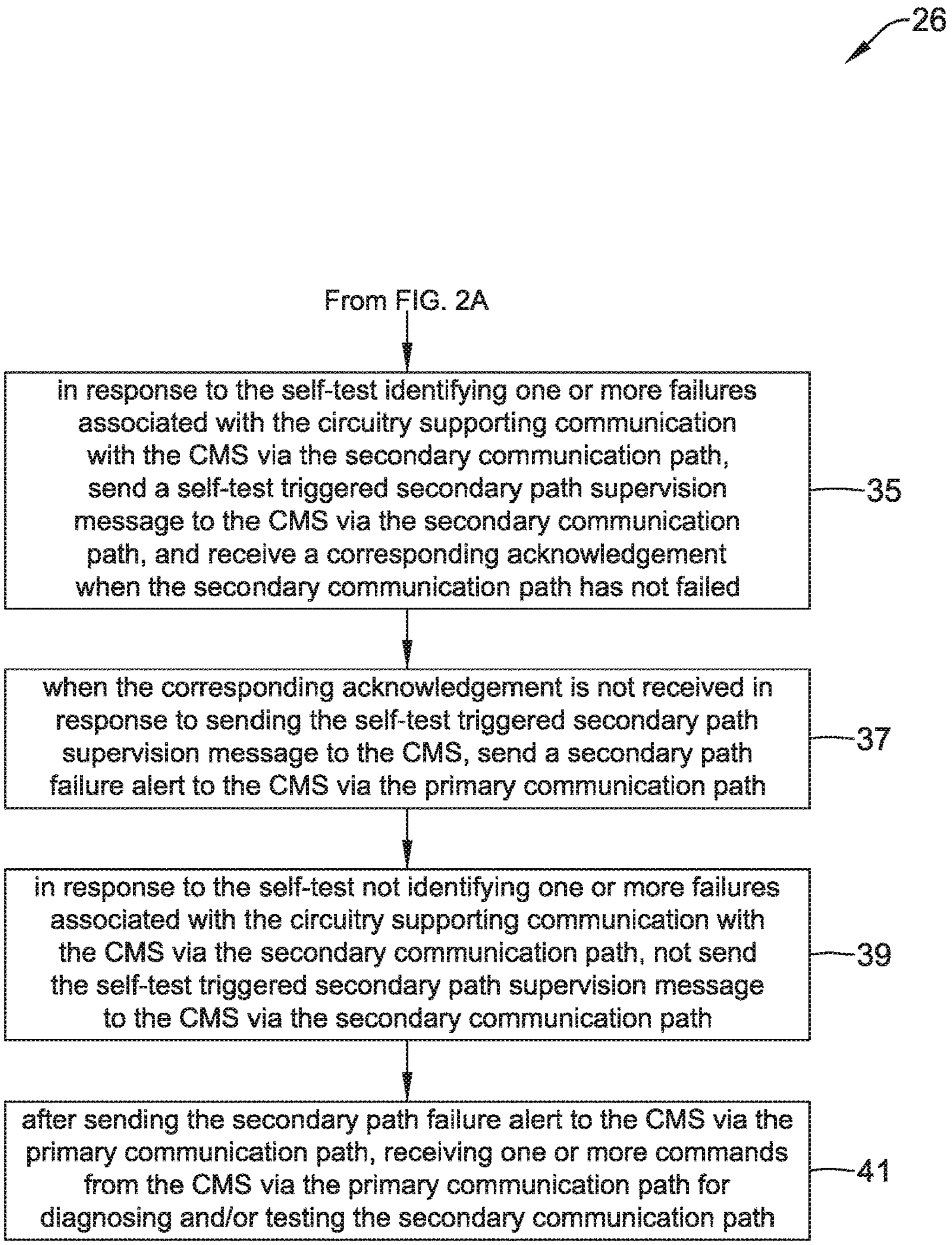

FIGS. 2A and 2B are flow diagrams that together show an illustrative series of steps 26 that the controller 24 of FIG. 1 may be configured to carry out. The controller 24 may be configured to communicate alarms to the off-site CMS 14 via the primary communication path 18 when the primary communication path 18 has not failed, and to communicate alarms to the off-site CMS 14 via the secondary communication path 22 when the primary communication path 18 has failed, as indicated at block 28. The controller 24 may be configured to repeatedly send a primary path supervision message to the off-site CMS 14 via the primary communication path 18 at a primary communication supervisory rate, and receive a corresponding acknowledgement via the primary communication path 18 for each of the primary path supervision messages when the primary communication path 18 has not failed, as indicated at block 30.

The controller 24 may be configured to repeatedly send a secondary path supervision message to the off-site CMS 14 via the secondary communication path 22 at a secondary communication path supervisory rate, and receive a corresponding acknowledgement for each of the secondary path supervision messages when the secondary communication path 22 has not failed, wherein the primary communication supervisory rate is higher than the secondary communication supervisory rate, as indicated at block 32. The controller may be configured to repeatedly perform a self-test of the second communication circuit 20 that supports communication with the CMS 14 via the secondary communication path 22 at a self-test rate, wherein the self-test is configured to identify one or more failures associated with the second communication circuit 20 that supports communication with the CMS 14 via the secondary communication path 22, as indicated at block 34. The self-test is configured to perform one or more tests on the second communication circuit 20 of the on-site control panel 12 without sending a supervision message to the CMS via the secondary communication path. In some cases, the self-test may be configured to identify one or more hardware failures associated with the second communication circuit 20. In some cases, the self-test may be configured to identify a weak or missing wireless signal associated with a wireless communication path of the secondary communication path 22 as one of the one or more failures associated with the second communication circuit 20. In some cases, the self-test may be configured to identify an abnormal status of the second communication circuit 20 as one of the one or more failures associated with the second communication circuit 20.

Continuing on FIG. 2B, and in response to the self-test identifying one or more failures associated with the second communication circuit 20, the controller 24 may be configured to send a self-test triggered secondary path supervision message to the off-site CMS 14 via the secondary communication path 22, and to receive a corresponding acknowledgement when the secondary communication path 22 has not failed, as indicated at block 35. When the corresponding acknowledgement is not received in response to sending the self-test triggered secondary path supervision message to the off-site CMS 14, the controller 24 may be configured to send a secondary path failure alert to the off-site CMS 14 via the primary communication path 18, as indicated at block 37. In response to the self-test not identifying one or more failures associated with the second communication circuit 20, the controller 24 may be configured to not send the self-test triggered secondary path supervision message to the off-site CMS 14 via the secondary communication path 22, as indicated at block 39.

After sending the secondary path failure alert to the off-site CMS 14 via the primary communication path 18, the controller 24 may be configured to receive one or more commands from the off-site CMS 14 via the primary communication path 18 for diagnosing and/or testing the secondary communication path 22, as indicated at block 41. In some cases, the one or more commands received from the off-site CMS 14 via the primary communication path 18 for diagnosing and/or testing the secondary communication path 22 may be initiated by an operator of the off-site CMS 14.

Figure 3:
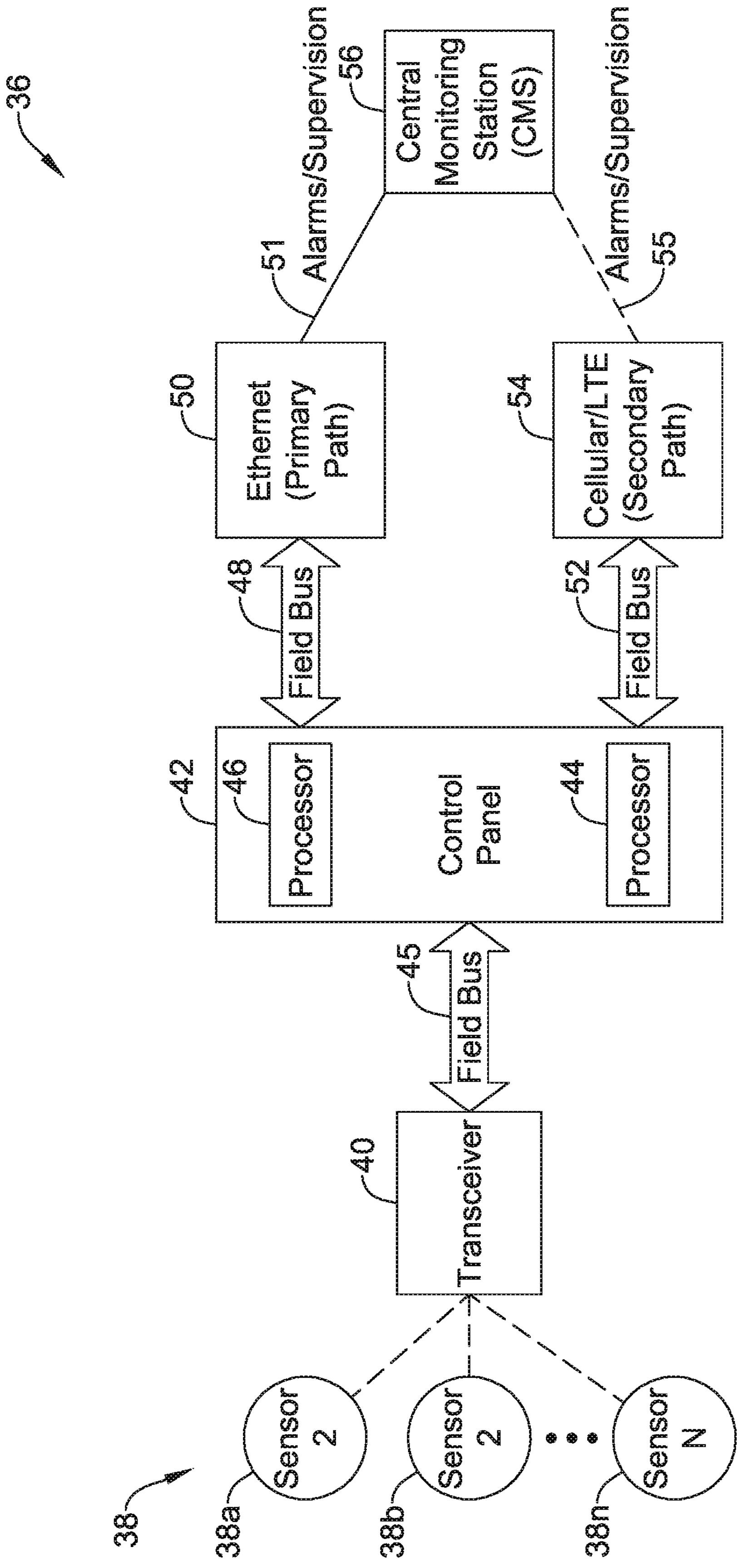
FIG. 3 is a schematic block diagram showing features of the illustrative security system of FIG. 1.

FIG. 3 is a schematic block diagram showing an illustrative security system 36. In some instances, the security system 36 may be considered as being an example of the security system 10. The security system 36 includes a number of sensors 38, individually labeled as 38*a*, 38*b* and through 38*n*. The security system 36 may include any number of sensors 38, thus "n" may be any desired integer. Each of the sensors 38 communicate with a transceiver 40. In some cases, the transceiver 40 then communicates with a control panel 42 via a field bus 45. The control panel 42 may be considered as an example of on-site control panel 12 shown in FIG. 1. The control panel 42 includes a memory 44 and a processor 46, which may be considered as being analogous to the controller 24 shown in FIG. 1. The control panel 42 is able to communicate through a field bus 48 that couples the control panel 42 to first communication circuit 50 supporting communication with a CMS 56 via a primary communication path 51. The primary communication path 51 may be an example of the primary communication path 18 of FIG. 1. In some cases, the first communication circuit 50 may be part of the control panel 42, and may be an example of first communication circuit 16 of FIG. 1. The control panel 42 is able to communicate through a field bus 52 that couples the control panel 42 to second communication circuit 54 supporting communication with the CMS 56 via a secondary communication path 55. The secondary communication path 55 may be an example of the secondary communication path 22 of FIG. 1. In some cases, the second communication circuit 54 may be part of the control panel 42, and may be an example of second communication circuit 20 of FIG. 1.

Alarms and other alerts raised by the control panel 42 may travel over the primary communication path 51 to the central monitoring station (CMS) 56 when the primary communication path 51 is functioning properly. Alarms and other alerts raised by the control panel 42 may travel over the secondary communication path 55 to the CMS 56 when the primary communication path 51 is not functioning properly. The CMS 56 may be considered as being analogous to the off-site CMS 14 shown in FIG. 1.

The control panel 42 may be configured to repeatedly send a primary path supervision message to the off-site CMS 56 via the primary communication path 51 at a primary communication supervisory rate, and receive a corresponding acknowledgement via the primary communication path 51 for each of the primary path supervision messages when the primary communication path 51 has not failed, as indicated at block 30. The control panel 42 may be configured to repeatedly send a secondary path supervision message to the off-site CMS 56 via the secondary communication path 55 at a secondary communication path supervisory rate, and receive a corresponding acknowledgement for each of the secondary path supervision messages when the secondary communication path 55 has not failed, wherein the primary communication supervisory rate is higher than the secondary communication supervisory rate. The control panel 42 may be configured to repeatedly perform a self-test of the second communication circuit 54 that supports communication with the CMS 56 via the secondary communication path 55 at a self-test rate, wherein the self-test is configured to identify one or more failures associated with the second communication circuit 54 that supports communication with the CMS 56 via the secondary communication path 55. The self-test is configured to perform one or more tests on the second communication circuit 54 without sending a supervision message to the CMS 56 via the secondary communication path 55. In some cases, the self-test may be configured to identify one or more hardware failures associated with the second communication circuit 54. In some cases, the self-test may be configured to identify a weak or missing wireless signal associated with a wireless communication path of the secondary communication path 55 as one of the one or more failures associated with the second communication circuit 54. In some cases, the self-test may be configured to identify an abnormal status of the second communication circuit 54 as one of the one or more failures associated with the second communication circuit 54.

In response to the self-test identifying one or more failures associated with the second communication circuit 54 (sometimes of the control panel 42), the control panel 42 may be configured to send a self-test triggered secondary path supervision message to the off-site CMS 56 via the secondary communication path 55, and to receive a corresponding acknowledgement when the secondary communication path 55 has not failed. When the corresponding acknowledgement is not received in response to sending the self-test triggered secondary path supervision message to the off-site CMS 56, the control panel 42 may be configured to send a secondary path failure alert to the off-site CMS 56 via the primary communication path 51. In response to the self-test not identifying one or more failures associated with the second communication circuit 54, the control panel 42 may be configured to not send the self-test triggered secondary path supervision message to the off-site CMS 56 via the secondary communication path 55. After sending the secondary path failure alert to the off-site CMS 56 via the primary communication path 51, the control panel 42 may be configured to receive one or more commands from the off-site CMS 56 via the primary communication path 51 for diagnosing and/or testing the secondary communication path 55. In some cases, the one or more commands received from the off-site CMS 56 via the primary communication path 51 for diagnosing and/or testing the secondary communication path 55 may be initiated by an operator of the off-site CMS 56.

Figure 4A:
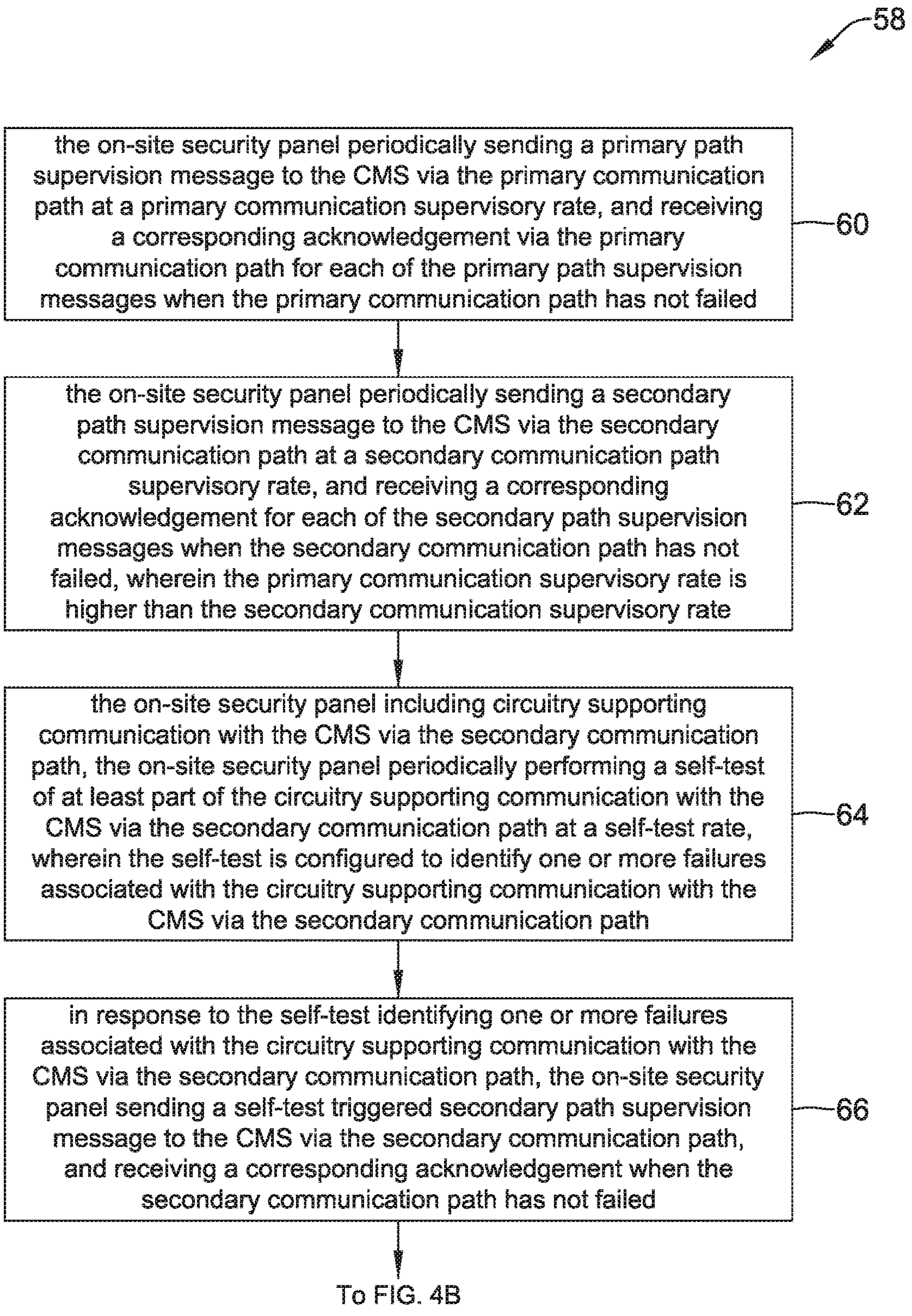
FIGS. 4A and 4B are flow diagrams that together show an illustrative method for improving the reliability of a security system such as the illustrative security system of FIG. 1.
Figure 4B:
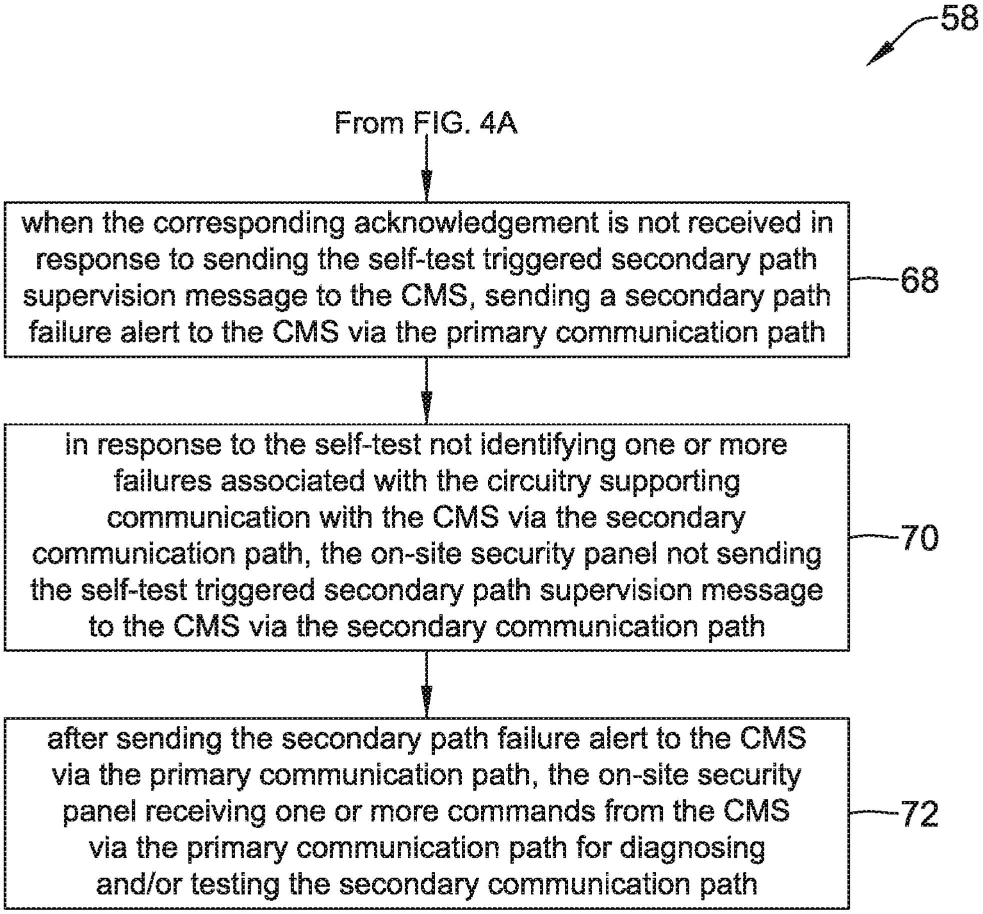

FIGS. 4A and 4B are flow diagrams that together show an illustrative method 58 for improving the reliability of a security system (such as the security system 10) that includes an on-site security panel (such as the on-site control panel 12) and an off-site central monitoring station (CMS) (such as the off-site CMS 14), the on-site security panel communicating security related alarms to the CMS via a primary communication path (such as the primary communication path 18) when the primary communication path has not failed, and communicating security related alarms to the CMS via a secondary communication path (such as the secondary communication path 22) when the primary communication path has failed. The illustrative method 58 includes the on-site security panel periodically sending a primary path supervision message to the CMS via the primary communication path at a primary communication supervisory rate, and receiving a corresponding acknowledgement via the primary communication path for each of the primary path supervision messages when the primary communication path has not failed, as indicated at block 60. The on-site security panel periodically sends a secondary path supervision message to the CMS via the secondary communication path at a secondary communication path supervisory rate, and receiving a corresponding acknowledgement for each of the secondary path supervision messages when the secondary communication path has not failed, wherein the primary communication supervisory rate is higher than the secondary communication supervisory rate, as indicated at block 62.

The on-site security panel periodically performing a self-test of circuitry of or associated with the on-site security panel that supports communication with the CMS via the secondary communication path at a self-test rate, as shown at block 64. In some cases, the self-test rate may be higher than the secondary communication path supervisory rate. In some cases, the self-test rate may be higher than the secondary communication path supervisory rate and lower than the primary communication supervisory rate. In one example, the primary communication supervisory rate may be more frequent than once every 5 minutes and the secondary communication supervisory rate may be less frequent than one every hour, and the self-test rate may be more frequent than once every hour. As another example, the primary communication supervisory rate may be more frequent than once every 2 minutes, the secondary communication supervisory rate may be less frequent than once every four hours, and the self-test rate may be more frequent than once every 10 minutes. These are just examples.

When the primary communication path is a wired communication path and the secondary communication path is a wireless communication path, the self-test may be configured to identify one or more hardware failures associated with circuitry supporting communication with the CMS via the secondary communication path. In some cases, the self-test may be configured to identify a weak or missing wireless signal associated with the wireless communication path of the secondary communication path (e.g. cell tower is down, or an intervening object is attenuating the wireless signal). In some cases, the self-test may be configured to identify an abnormal status of the circuitry supporting communication with the CMS via the secondary communication path. When the primary communication path is a wired communication path and the secondary communication path is a wireless cellular communication path, and the circuitry supporting communication with the CMS via the secondary communication path includes a SIM card, the self-test may be configured to identify an abnormal status of a SIM card (allotted monthly data limit associated with the SIM card has been reached, SIM card is no longer registered with the cellular network, SIM card has been removed, SIM card is not properly seated, SIM card has a hardware error, etc.). Table 1 below provides some example SIM card errors that may be detected by the self-test of the circuitry supporting communication with the CMS via the secondary communication path.

TABLE 1

| Error Type | Description of Possible SIM related/Cell radio faults | Test Method |
|---|---|---|
| SIM low signal quality | SIM signal strength can be adversely affected due,<br>1. Atmospheric condition changes<br>2. Man made obstacle.<br>3. High demand and usage<br>4. Maintenance activity<br>5. Network congestion | The control panel will periodically check the RSSI, RSRP, RSRQ and SNR level of the cellular signal and once it goes below threshold, panel will predict that there is chance of cellular path failure. |
| SIM Failure | SIM failure refers to a situation where a cell radio is unable to recognize or communicate with the Cellular network via SIM (Subscriber Identity Module). Example follows<br>1. SIM card compatibility issues. Post certain period the SIM card may be incompatible with cellular network due to change/upgrade in the service provider infrastructure.<br>2. Software or firmware issues due to unstable Software/firmware | The control panel will periodically check SIM card status and once it detects SIM failure, then the panel will predict that there is chance of cellular path failure. |
| SIM not inserted | The "SIM not inserted" error occurs when a cell radio fails to detect the presence of a SIM (Subscriber Identity Module) card inserted into its SIM card slot.<br>1. Improper insertion<br>2. Physical damage to the SIM card<br>3. Faulty SIM card or SIM card slot<br>4. Exposing the SIM card to extreme temperatures or moisture.<br>5. Dirty or corroded SIM card contacts | The control panel will periodically check SIM card status (Cellular module will periodically check the SIM availability) and once it detects SIM failure, then the panel will predict that there is chance of cellular path failure. |
| SIM PIN/PUK (Personal Unblocking Key) Errors | SIM cards are often protected with a Personal Identification Number (PIN) and a Personal Unblocking Key (PUK). Entering an incorrect PIN multiple times can result in the SIM being locked, requiring the PUK to unlock it. Errors related to PIN and PUK entry can occur if the user enters the wrong codes or if the SIM card is permanently locked. | PIN will be used by the cellular module for every broad band connection for security purpose. During any broad band connection due to wrong PIN the PUK Error will occur. Control panel will periodically (in our case 3 minutes) check the PUK status of the cellular module. |
| SIM Registration Failure | When a SIM card is unable to register with the mobile network, it results in a SIM registration failure error.<br>This could be due to,<br>1. Using a SIM card that is expired/deactivated.<br>2. Wrong APN/Credentials configuration. | The control panel will periodically check SIM Registration status and once it detects registration failure, then the panel will predict that there is chance of cellular path failure. |
| SIM Toolkit Errors | SIM Toolkit (STK) is a set of applications installed on the SIM card to provide additional functionality. Errors related to the SIM Toolkit can occur if there are issues with the STK applications or if the device does not support certain STK features. | The control panel will periodically check SIM card status and once it detects toolkit failure, then the panel will predict that there is chance of cellular path failure. |

TABLE 1-continued

| Error Type | Description of Possible SIM related/Cell radio faults | Test Method |
|---|---|---|
| Unresponsive State | LTE/Cellular module not responding for the Status check message. Due to hardware failure, firmware failure, communication failure. | The control panel will periodically send the module status query to LTE/cellular module. If no response, then then the panel will predict that there is chance of cellular path failure. |

In response to the self-test identifying one or more failures associated with the circuitry supporting communication with the CMS via the secondary communication path, the on-site security panel sends a self-test triggered secondary path supervision message to the CMS via the secondary communication path, and receives a corresponding acknowledgement when the secondary communication path has not failed, as indicated at block 66.

Continuing on FIG. 4B, when the corresponding acknowledgement is not received in response to sending the self-test triggered secondary path supervision message to the CMS, a secondary path failure alert is sent to the CMS via the primary communication path, as indicated at block 68. In response to the self-test not identifying one or more failures associated with the circuitry supporting communication with the CMS via the secondary communication path, the on-site security panel does not send the self-test triggered secondary path supervision message to the CMS via the secondary communication path, as indicated at block 70. In some instances, the method 58 may include, after sending the secondary path failure alert to the CMS via the primary communication path, the on-site security panel receiving one or more commands from the CMS via the primary communication path for diagnosing and/or testing the secondary communication path, as indicated at block 72. In some cases, the one or more commands received from the CMS via the primary communication path for diagnosing and/or testing the secondary communication path may be initiated by an operator of the CMS.

Figure 5:
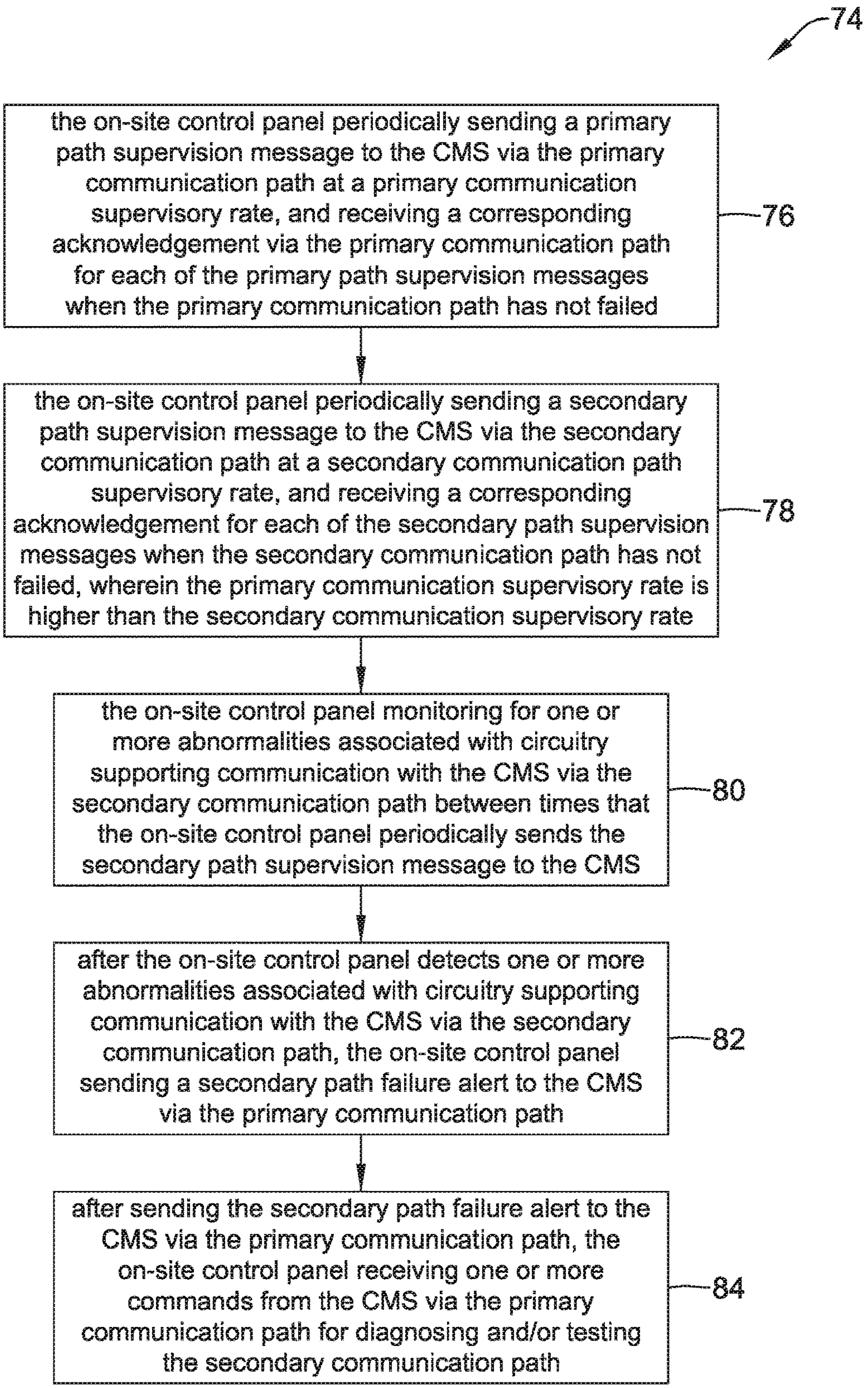
FIG. 5 is a flow diagram showing an illustrative method for improving the reliability of a security system such as the illustrative security system of FIG. 1.

FIG. 5 is a flow diagram showing an illustrative method 74 for operating an on-site control panel (such as the on-site control panel 12), wherein the on-site control panel is configured to communicate alarms to an off-site central monitoring station (CMS) (such as the off-site CMS 14) via a primary communication path (such as the primary communication path 18) when the primary communication path has not failed, and to communicate alarms to the CMS via a secondary communication path (such as the secondary communication path 22) when the primary communication path has failed. The illustrative method includes the on-site control panel periodically sending a primary path supervision message to the CMS via the primary communication path at a primary communication supervisory rate, and receiving a corresponding acknowledgement via the primary communication path for each of the primary path supervision messages when the primary communication path has not failed, as indicated at block 76. The on-site control panel periodically sends a secondary path supervision message to the CMS via the secondary communication path at a secondary communication path supervisory rate, and receiving a corresponding acknowledgement for each of the secondary path supervision messages when the secondary communication path has not failed, wherein the primary communication supervisory rate is higher than the secondary communication supervisory rate, as indicated at block 78.

The on-site control panel monitors for one or more abnormalities associated with circuitry supporting communication with the CMS via the secondary communication path between times that the on-site control panel periodically sends the secondary path supervision message to the CMS, as indicated at block 80. After the on-site control panel detects one or more abnormalities associated with circuitry (e.g. of the on-site control panel) supporting communication with the CMS via the secondary communication path, the on-site control panel sends a secondary path failure alert to the CMS via the primary communication path, as indicated at block 82. After sending the secondary path failure alert to the CMS via the primary communication path, the on-site control panel receives one or more commands from the CMS via the primary communication path for diagnosing and/or testing the secondary communication path. As an example, the one or more commands received from the CMS via the primary communication path for diagnosing and/or testing the secondary communication path may be initiated by an operator of the CMS, as indicated at block 84.

Figure 6:
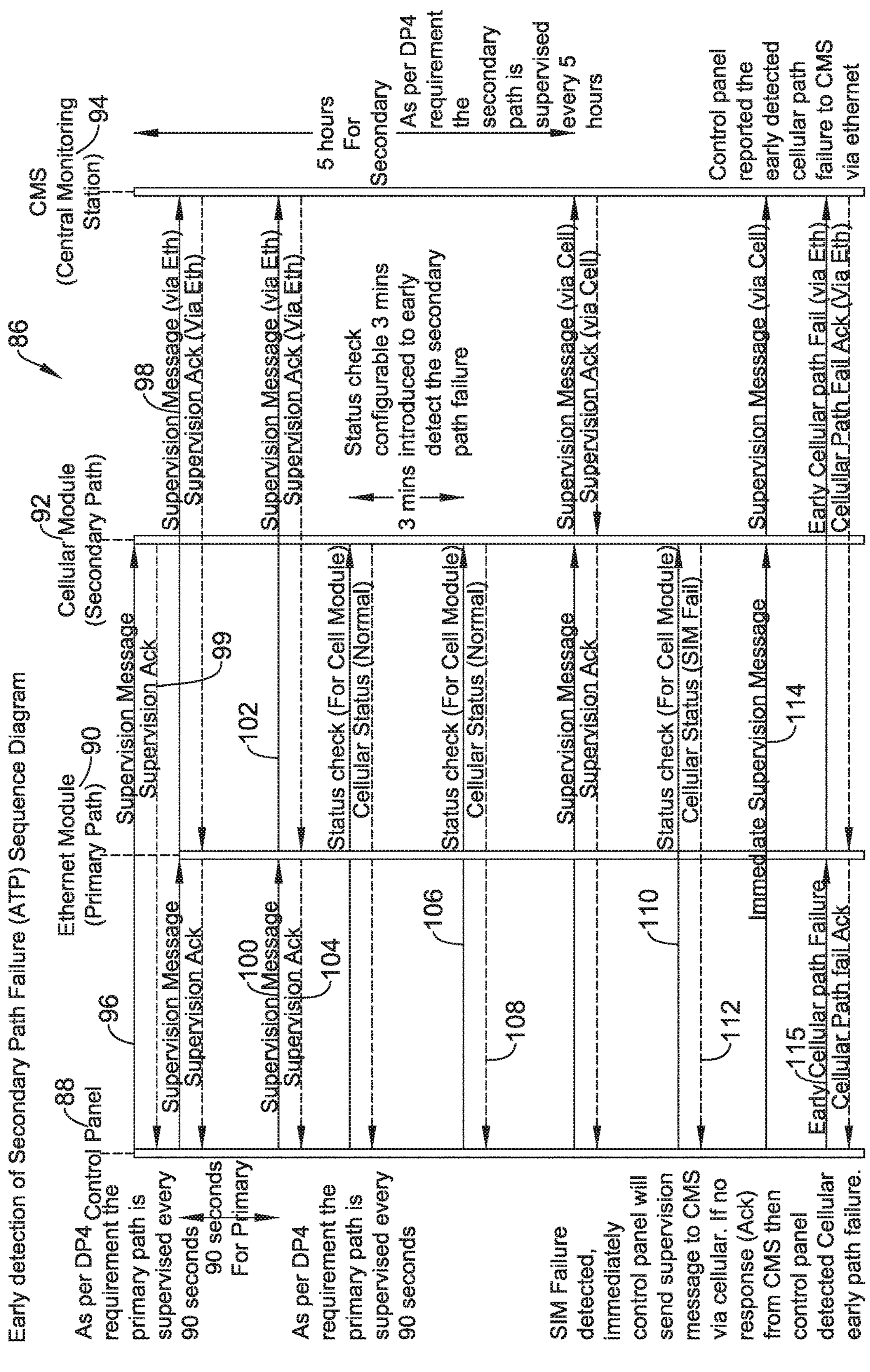
FIG. 6 is a sequence diagram showing an illustrative secondary communication path failure detection sequence.

FIG. 6 is a sequence diagram showing an illustrative secondary communication path failure detection sequence 86 showing an example communications between a control panel 88, an ethernet module 90 (circuitry supporting communication via a primary communication path), a cellular module 92 (circuitry supporting communication via the secondary communication path) and a Central Monitoring Station (CMS) 94. The control panel 88 periodically outputs a supervision message to the cellular module 92, as shown at 96. In response, the cellular module 92 sends a supervision message to the CMS 94, as shown at 98. A supervision acknowledgement is sent from the CMS 94 to the cellular module 92 and then back to the control panel, as shown at 97. Periodically, the control panel 88 sends a supervision message to the ethernet module 90, such as shown at 100. In response, the ethernet module 90 sends a supervision message to the CMS 94, as shown at 102. A supervision acknowledgement is sent from the CMS 94 to the ethernet module 90, and then back to the control panel 88, as shown at 104. If operating according to standard DP4 requirements, the control panel 88 tests the primary path every 90 seconds, and is only required to test the secondary path every 5 hours.

In some cases, the control panel 88 will send periodically (e.g. every three minutes in the example shown), and between supervision messages that are every 5 hours, a status check to the cellular module 92, as shown for example at 106. Assuming that the cellular module 92 is functioning properly, the cellular module 92 will return a cellular status normal message back to the control panel 88, as shown for example at 108. In some cases, the cellular module 92 may not be functioning properly, such as in response to status check 110. Because the cellular module 92 is not functioning correctly, the cellular module 92 returns a cellular status (fail) to the control panel 88, as shown for example at 112. In response, the control panel 88 immediately sends a supervision message to the cellular module 92 to attempt to send a supervisory message to the CMS 94 via the cellular module 92 via the secondary communication path, as shown for example at 114. If the cellular module 92 is not functioning correctly, and no acknowledgement is received from the CMS 94 via the secondary communication path, the control panel sends a message to that effect to the CMS 94 via the Ethernet module 90 (e.g. the primary communication path). The CMS 94 may raise an alarm, indicating a problem with the cellular module 92.

Table 2 provides EN 50136-1 ATP reporting requirements:

TABLE 2

| REPORTING REQUIREMENTS | | | | | | | | | | |
|---|---|---|---|---|---|---|---|---|---|---|
| | SP1 | SP2 | SP3 | SP4 | SP5 | SP6 | DP1 | DP2 | DP3 | DP4 |
| Primary ATP Reporting time | 32 days | 25 h | 30 min | 3 min | 90 s | 20 s | 25 h | 30 min | 3 min | 90 s |
| Alternative ATP Maximum period when primary operational | Op | Op | Op | Op | Op | Op | 50 h | 25 h | 25 h | 5 h |

Figure 7A:
FIGS. 7A, 7B and 7C are screen shots showing secondary communication path test results.
Figure 7B:
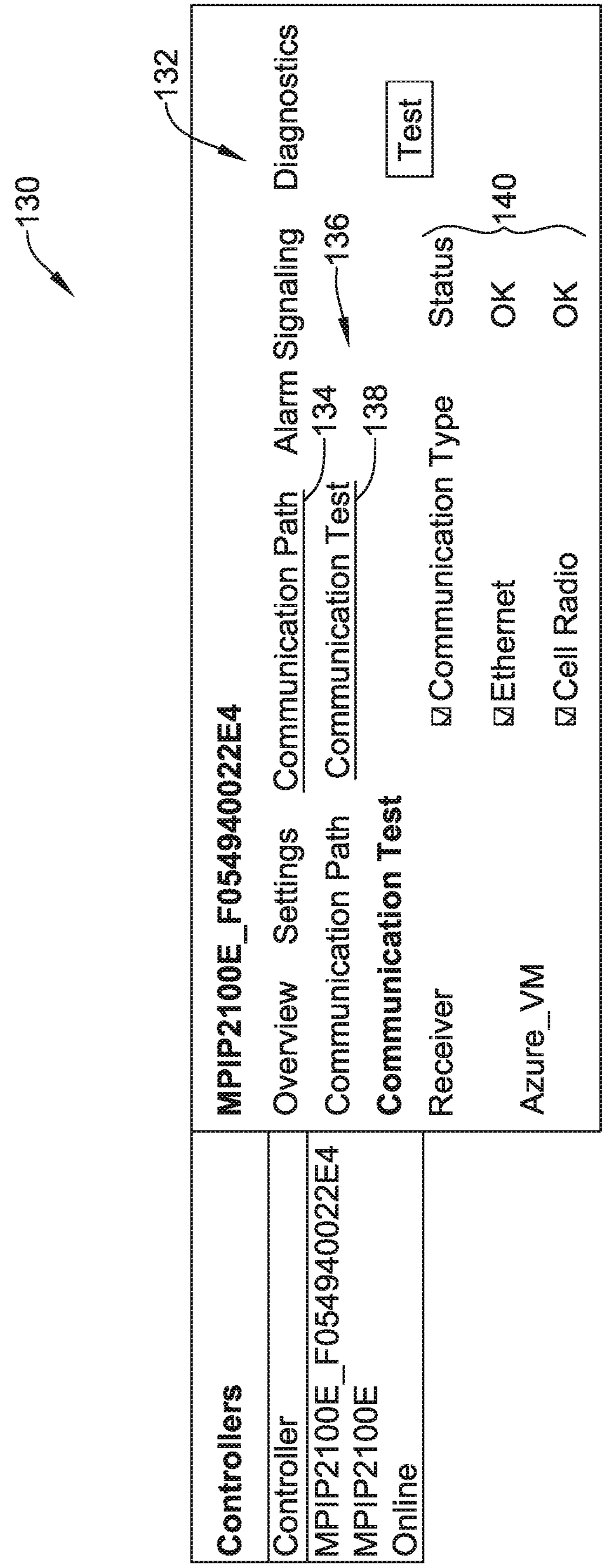
Figure 7C:
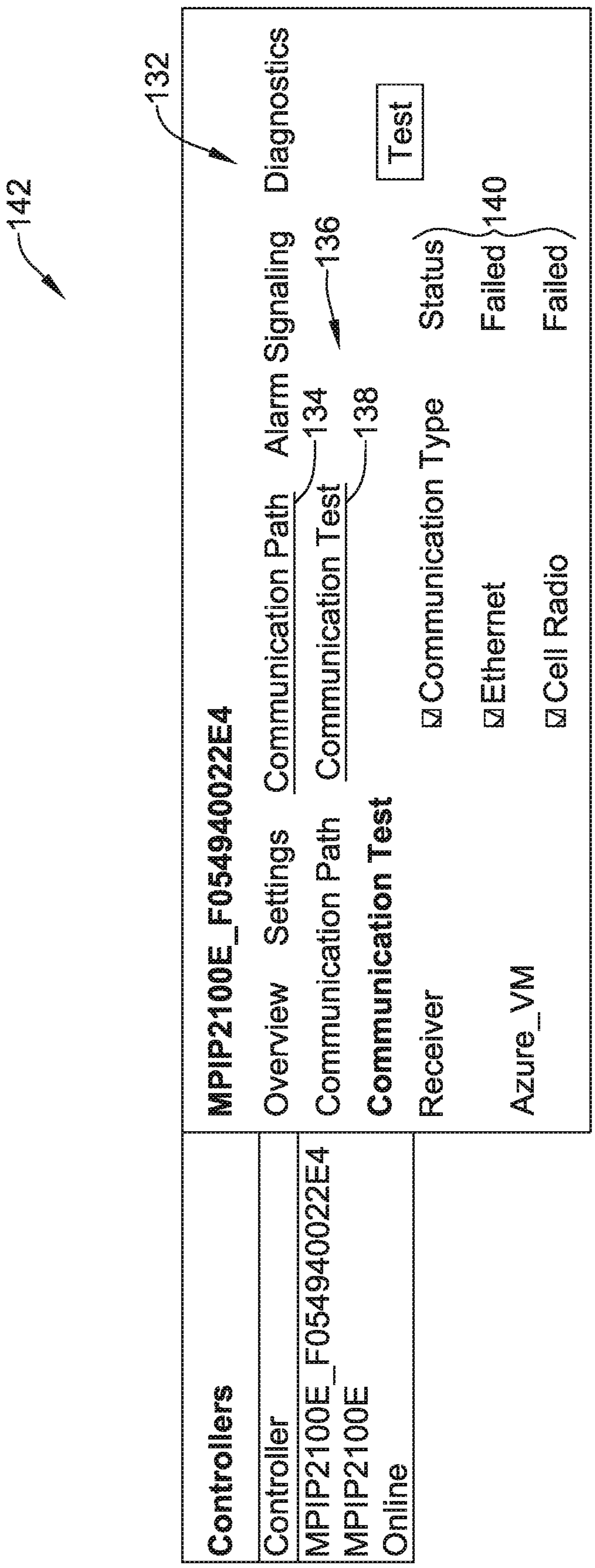

FIGS. 7A, 7B and 7C are screen shots showing secondary communication path test results. FIG. 7A shows a listing 120 of cellular communication parameters that may be displayed when testing a cell radio of the on-site control panel. FIG. 7B shows a screen 130 including a taskbar 132 that may be used to select between several different testing options. As shown, the Communication Path option 134 has been selected. A secondary toolbar 136 also provides options. As shown, the Communication Test option 138 has been selected. The screen 130 includes a results section 140 that shows that both the Ethernet (wired communication path) and the cell radio (wireless communication path) functioning properly. FIG. 7C shows a screen 142 that is similar to the screen 130. However, in FIG. 7C, the results section 140 shows that both the Ethernet (wired communication path) and the cell radio (wireless communication path) have failed their tests.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for improving the reliability of a security system that includes an on-site security panel and an off-site central monitoring station (CMS), the on-site security panel communicating security related alarms to the CMS via a primary communication path when the primary communication path has not failed, and communicating security related alarms to the CMS via a secondary communication path when the primary communication path has failed, the method comprising:

the on-site security panel periodically sending a primary path supervision message to the CMS via the primary communication path at a primary communication supervisory rate, and receiving a corresponding acknowledgement via the primary communication path for each of the primary path supervision messages when the primary communication path has not failed;

the on-site security panel periodically sending a secondary path supervision message to the CMS via the secondary communication path at a secondary communication path supervisory rate, and receiving a corresponding acknowledgement for each of the secondary path supervision messages when the secondary communication path has not failed, wherein the primary communication supervisory rate is higher than the secondary communication supervisory rate;

the on-site security panel including circuitry supporting communication with the CMS via the secondary communication path, the on-site security panel periodically performing a self-test of at least part of the circuitry supporting communication with the CMS via the secondary communication path at a self-test rate, wherein the self-test is configured to identify one or more failures associated with the circuitry supporting communication with the CMS via the secondary communication path;

in response to the self-test identifying one or more failures associated with the circuitry supporting communication with the CMS via the secondary communication path, the on-site security panel sending a self-test triggered secondary path supervision message to the CMS via the secondary communication path, and receiving a corresponding acknowledgement when the secondary communication path has not failed;

when the corresponding acknowledgement is not received in response to sending the self-test triggered secondary path supervision message to the CMS, sending a secondary path failure alert to the CMS via the primary communication path; and in response to the self-test not identifying one or more failures associated with the circuitry supporting communication with the CMS via the secondary communication path, the on-site security panel not sending the self-test triggered secondary path supervision message to the CMS via the secondary communication path.

2. The method of claim 1, wherein the self-test rate is higher than the secondary communication path supervisory rate.

3. The method of claim 1, wherein the self-test rate is higher than the secondary communication path supervisory rate and lower than the primary communication supervisory rate.

4. The method of claim 1, further comprising:

after sending the secondary path failure alert to the CMS via the primary communication path, the on-site security panel receiving one or more commands from the CMS via the primary communication path for diagnosing and/or testing the secondary communication path.

5. The method of claim 4, wherein the one or more commands received from the CMS via the primary communication path for diagnosing and/or testing the secondary communication path are initiated by an operator of the CMS.

6. The method of claim 1, wherein the primary communication path is a wired communication path and the secondary communication path is a wireless communication path, wherein the self-test is configured to identify one or more hardware failures associated with the circuitry supporting communication with the CMS via the secondary communication path.

7. The method of claim 1, wherein the primary communication path is a wired communication path and the secondary communication path is a wireless communication path, wherein the self-test is configured to identify a weak or missing wireless signal associated with the wireless communication path of the secondary communication path.

8. The method of claim 1, wherein the primary communication path is a wired communication path and the secondary communication path is a wireless communication path, wherein the self-test is configured to identify an abnormal status of the circuitry supporting communication with the CMS via the secondary communication path.

9. The method of claim 1, wherein the primary communication path is a wired communication path and the secondary communication path is a wireless cellular communication path, wherein the circuitry supporting communication with the CMS via the secondary communication path includes a SIM card, and wherein the self-test is configured to identify an abnormal status of a SIM card.

10. An on-site control panel comprising:

a primary communication circuit configured to support communication with an off-site central monitoring station (CMS) over a primary communication path;

a secondary communication circuit configured to support communication with the CMS over a secondary communication path;

a controller operatively coupled to the primary communication circuitry and the secondary communication circuitry, the controller configured to:

communicate alarms to the CMS via the primary communication path when the primary communication path has not failed, and communicate alarms to the CMS via the secondary communication path when the primary communication path has failed;

repeatedly send a primary path supervision message to the CMS via the primary communication path at a primary communication supervisory rate, and receive a corresponding acknowledgement via the primary communication path for each of the primary path supervision messages when the primary communication path has not failed;

repeatedly send a secondary path supervision message to the CMS via the secondary communication path at a secondary communication path supervisory rate, and receive a corresponding acknowledgement for each of the secondary path supervision messages when the secondary communication path has not failed, wherein the primary communication supervisory rate is higher than the secondary communication supervisory rate;

repeatedly performing a self-test of the circuitry supporting communication with the CMS via the secondary communication path at a self-test rate, wherein the self-test is configured to identify one or more failures associated with the secondary communication path;

in response to the self-test identifying one or more failures associated with the circuitry supporting communication with the CMS via the secondary communication path, send a self-test triggered secondary path supervision message to the CMS via the secondary communication path, and receive a corresponding acknowledgement when the secondary communication path has not failed;

when the corresponding acknowledgement is not received in response to sending the self-test triggered secondary path supervision message to the CMS, send a secondary path failure alert to the CMS via the primary communication path; and in response to the self-test not identifying one or more failures associated with the secondary communication path, not send the self-test triggered secondary path supervision message to the CMS via the secondary communication path.

11. The on-site control panel of claim 10, wherein after sending the secondary path failure alert to the CMS via the primary communication path, the controller is configured to receive one or more commands from the CMS via the primary communication path for diagnosing and/or testing the secondary communication path.

12. The on-site control panel of claim 11, wherein the one or more commands received from the CMS via the primary communication path for diagnosing and/or testing the secondary communication path are initiated by an operator of the CMS.

13. The on-site control panel of claim 10, wherein the primary communication path is a wired communication path and the secondary communication path is a wireless communication path, wherein the self-test is configured to identify one or more hardware failures associated with the secondary communication circuit.

14. The on-site control panel of claim 10, wherein the primary communication path is a wired communication path and the secondary communication path is a wireless communication path, wherein the self-test is configured to identify a weak or missing wireless signal associated with the wireless communication path of the secondary communication path as one of the one or more failures associated with the secondary communication circuit.

15. The on-site control panel of claim 10, wherein the primary communication path is a wired communication path and the secondary communication path is a wireless communication path, wherein the self-test is configured to identify an abnormal status of the secondary communication circuit as one of the one or more failures associated with the secondary communication circuit.

16. A method for operating an on-site control panel, wherein the on-site control panel is configured to communicate alarms to an off-site central monitoring station (CMS) via a primary communication path when the primary communication path has not failed, and to communicate alarms to the CMS via a secondary communication path when the primary communication path has failed, the method comprising:

the on-site control panel periodically sending a primary path supervision message to the CMS via the primary communication path at a primary communication supervisory rate, and receiving a corresponding acknowledgement via the primary communication path for each of the primary path supervision messages when the primary communication path has not failed;

the on-site control panel periodically sending a secondary path supervision message to the CMS via the secondary communication path at a secondary communication path supervisory rate, and receiving a corresponding acknowledgement for each of the secondary path supervision messages when the secondary communication path has not failed, wherein the primary communication supervisory rate is higher than the secondary communication supervisory rate;

the on-site control panel monitoring for one or more abnormalities associated with circuitry supporting communication with the CMS via the secondary communication path between times that the on-site control panel periodically sends the secondary path supervision message to the CMS; and after the on-site control panel detects one or more abnormalities associated with circuitry supporting communication with the CMS via the secondary communication path, the on-site control panel sending a secondary path failure alert to the CMS via the primary communication path.

17. The method of claim 16, wherein after sending the secondary path failure alert to the CMS via the primary communication path, the on-site control panel receiving one or more commands from the CMS via the primary communication path for diagnosing and/or testing the secondary communication path.

18. The method of claim 17, wherein the one or more commands received from the CMS via the primary communication path for diagnosing and/or testing the secondary communication path are initiated by an operator of the CMS.

* * * * *